United States Patent
Schomaker et al.

(10) Patent No.: US 6,355,094 B1
(45) Date of Patent: Mar. 12, 2002

(54) MATERIAL FOR THE REMOVAL OF GASEOUS IMPURITIES FROM A GAS MIXTURE

(75) Inventors: Elwin Schomaker, Velp; Johannes Bos, Westervoort, both of (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/721,017

(22) Filed: Nov. 22, 2000

Related U.S. Application Data

(62) Division of application No. 08/832,331, filed on Mar. 26, 1997, now abandoned.

(30) Foreign Application Priority Data

Jan. 6, 1994 (NL) .............................................. 9400012

(51) Int. Cl.$^7$ .............................................. B01D 53/02
(52) U.S. Cl. .............................. 95/92; 95/116; 95/135; 423/242.7; 423/244.01
(58) Field of Search ............................... 95/92, 90, 116, 95/135, 137, 900; 96/108, 153, 135; 423/228, 242.2, 242.7, 244.01

(56) References Cited

U.S. PATENT DOCUMENTS

| | | | | |
|---|---|---|---|---|
| 2,818,323 A | * | 12/1957 | Haensel | |
| 3,507,051 A | * | 4/1970 | Calvert et al. ................. | 95/92 |
| 3,646,594 A | | 2/1972 | Lasky et al. | |
| 3,960,762 A | | 6/1976 | Kroebel et al. | |
| 4,003,848 A | | 1/1977 | Cotter et al. | |
| 4,247,498 A | | 1/1981 | Castro | |
| 5,231,063 A | * | 7/1993 | Fukumoto et al. ............. | 502/62 |
| 5,376,614 A | * | 12/1994 | Birbara et al. ............... | 423/228 |
| 5,492,683 A | * | 2/1996 | Birbara et al. ............... | 423/228 |
| 5,738,791 A | * | 4/1998 | Schomaker et al. ........ | 210/638 |
| 5,750,030 A | * | 5/1998 | Schomaker et al. ........ | 210/679 |
| 5,876,488 A | * | 3/1999 | Birbara et al. ................ | 96/111 |
| 6,171,372 B1 | * | 1/2001 | Ichiki et al. .................. | 95/129 |

FOREIGN PATENT DOCUMENTS

| | | | |
|---|---|---|---|
| EP | 0189606 | | 8/1986 |
| EP | 0662338 | * | 7/1995 |
| EP | 0662344 | * | 7/1995 |
| GB | 2049468 A | | 12/1980 |
| GB | 2115425 A | | 9/1983 |
| NL | 7217118 | | 6/1973 |
| WO | WO94/03249 | * | 2/1994 |

* cited by examiner

*Primary Examiner*—Duane S. Smith
(74) *Attorney, Agent, or Firm*—Dilworth & Barrese, LLP

(57) ABSTRACT

Porous, preferably dimensionally stable material and a method for using for the removal of gaseous impurities from a gas mixture, such as $H_2S$, COS, $CH_2$, and $SO_2$, into the pores of which there is incorporated a secondary amine which chemically bonds with the constituents to be removed, with the material including a hydrophobic polymer with pores having an average diameter in the range of from 0.1 to 50 $\mu$m and a secondary amine having hydrophobic properties which optionally is incorporated into a hydrophobic liquid is disclosed. Favorable results have been attained using polypropylene as the hydrophobic polymer and ditridecyl amine as the secondary amine, with a tertiary amine, such as $C_{12}$ to $C_{14}$-alkyl diethanol amine, being part of the hydrophobic liquid.

13 Claims, No Drawings

MATERIAL FOR THE REMOVAL OF GASEOUS IMPURITIES FROM A GAS MIXTURE

This application is a division of application Ser. No. 08/832,331 filed Mar. 26, 1997, now abandoned.

CROSS REFERENCE TO RELATED APPLICATIONS

This application claims the benefit of the filing date of prior Netherlands Patent Application Serial No. 9,400,012, filed Jan. 6, 1994, entitled "Material For The Removal Of Gaseous Impurities From A Gas Mixture", which is incorporated hereby by reference in its entirety.

BACKGROUND OF THE INVENTION

1. Field of the Invention

The present invention relates to a porous, preferably dimensionally stable material for the removal of gaseous impurities from a gas mixture, such as $H_2S$, COS, $CS_2$, and $SO_2$, into the pores of which there is incorporated a secondary amine which chemically bonds with the constituents to be removed and a method for such removal.

2. Description of Related Art

The use of porous material incorporating a secondary amine for the removal of gaseous impurities from a gas mixture has earlier been described in GB-A-2 049 468. The porous material described in that document includes mineral carriers which are inert towards secondary amines. Examples of suitable mineral carriers mentioned are pumice, kieselguhr, bauxite, alumina, carbon, and silicates. The particle size preferably is in the range of from 0.1 mm to 5 cm. Further, preference is given to particles having an internal porosity of at least 0.1, for example from 0.1 to 0.8. Internal porosity is defined as the ratio of the volume of internal empty space to the actual volume of the particles of solid; internal porosity is measured for example by means of mercury porosimetry.

In actual practice, using such known materials is attended with a wide range of problems connected with, on the one hand, the presence of minerals in the carrier material and, on the other, the hydrophilic nature of both the carrier material and the employed amines. The presence of traces of certain metals in carrier material of mineral origin may catalyze the conversion of $CS_2$ and COS into sulphur. A drawback to the use of hydrophilic amines is that it leads also to the bonding of $CO_2$. A further drawback consists in that regeneration by means of, e.g, steam stripping, is not readily workable in the case of every gas, for instance in that of $CS_2$.

SUMMARY OF THE INVENTION

In accordance with one aspect of the present invention, there is provided a porous, preferably dimensionally stable material for the removal of gaseous impurities from a gas mixture, such as $H_2S$, COS, $CS_2$, and $SO_2$, including a hydrophobic polymer having pores of an average diameter in the range of from 0.1 to 50 μm into the pores of which there is incorporated a secondary amine having hydrophobic properties which chemically bonds with the constituents to be removed.

In accordance with another aspect of the present invention, there is provided a method for the removal of gaseous impurities from a gas mixture including contacting the gas mixture with a hydrophobic polymer having pores of an average diameter in the range of from 0.1 to 50 μm, wherein in the pores thereof there is incorporated a secondary amine having hydrophobic properties which chemically bonds with the constituents to be removed and which optionally is incorporated into a hydrophobic liquid.

These and other objects of the present invention will become apparent upon a review of the following detailed description and the claims appended thereto.

DETAILED DESCRIPTION OF THE PREFERRED EMBODIMENTS

The present invention provides a porous material incorporating in its pores a secondary amine which chemically bonds with the constituents to be removed, which material is easy to regenerate on a commercial scale.

More particularly, the present invention provides a hydrophobic polymer having pores of an average diameter in the range of from 0.1 to 50 μm which contain a secondary amine having hydrophobic properties, which optionally is incorporated into a hydrophobic liquid.

The average pore diameter is determined with advantage using mercury porosimetry in accordance with ASTM D 4284-83.

It is regarded as extremely surprising that the use of a porous material having both a hydrophobic surface area and an average pore diameter in the indicated range provides a system which can be regenerated by means of, e.g., steam stripping and is so effective as to now render industrial scale use possible.

According to the present invention, favorable results are generally obtained when use is made of a porous material where at least 15% of the pores are filled with a liquid composed of secondary amine or a secondary amine-containing liquid.

More preferable results are commonly obtained when use is made of a material where at least 60% of the pores are filled with a liquid composed of secondary amine or a secondary amine-containing liquid.

It has been found that, as a rule, preferable results can be obtained when use is made of a material having an average pore diameter in the range of from 0.2 to 15 μm.

The secondary amines suitable for use according to the invention generally have a low vapor pressure, preference being given to amines having a boiling point of at least 250° C. As a rule, favorable results can be obtained when the secondary amine corresponds to the formula $R_1$—NH—$R_2$, wherein $R_1$ represents a functionalized or unfunctionalized (ar)aliphatic group with at least 7 carbon atoms and $R_2$ represents a functionalized or unfunctionalized (ar)alkyl group with at least 3 carbon atoms. Preference is given in this case to secondary amines having a total number of carbon atoms of at least 14. Examples of secondary amines according to the aforementioned formula include dibenzyl amine and ditridecyl amine. Very favorable results are obtained also when use is made of a secondary amine of the formula $R_3$—NH—$R_4$—NH—C(O)O—$R_5$, wherein $R_3$ represents a functionalized or unfunctionalized (ar)aliphatic group with at least 7 carbon atoms, $R_4$ represents a functionalized or unfunctionalized alkylene group with at least 2 carbon atoms, and $R_5$ represents a substituted or unsubstituted alkyl group with at least 2 carbon atoms. These compounds can be obtained by blocking the primary amino group of a compound having a primary as well as a secondary amino group. As examples of suitable blocking agents may be mentioned ethylene carbonate and propylene carbonate. In the above formula $R_3$ preferably is a coco- or $C_{12}$ to $C_{14}$-alkyl group, $R_4$ is an alkylene group with 2 to 6, preferably with 2 or 3 carbon atoms, and $R_5$ is a hydroxyalkyl group with 2 or 3 carbon atoms. Alternatively, it is possible to achieve favorable results by using a secondary amine obtained by converting an alkyl amine with an alkyl(meth)acrylate. As an example of such a compound is the reaction product of oleyl amine and butyl acrylate.

While the hydrophobic secondary amine may be incorporated into the pores of the hydrophobic polymer as such, preference is given to material where the secondary amine is dissolved in a hydrophobic liquid. If a regeneratable absorption system is required, the secondary amine and the hydrophobic liquid preferably both have high thermal, hydrolytic, oxidative, and chemical stability. The glycerol esters of one or more, preferably unsaturated fatty acids may be indicated as examples of a hydrophobic liquid suitable for use according to the present invention, with preference being given to an oil, e.g., palm oil, olive oil, groundnut oil, paraffin oil, fish oil such as herring oil, linseed oil, and, more particularly, soybean oil and/or castor oil. In general, the use of a hydrophobic liquid having one or more tertiary amino groups will be preferred, favorable results are obtained using an alkyl dialkanol amine, more particularly an alkyl diethanol amine, even more particularly a $C_{12}$ to $C_{14}$-alkyl diethanol amine. Preferably, the equivalency ratio of secondary amino groups to tertiary amino groups is $\leq 1$.

The process of preparing from hydrophobic polymers a porous, preferably dimensionally stable material suitable for use according to the present invention has been described, int.al., in U.S. Pat. No. 4,247,498, which is incorporated herein by reference in its entirety. Examples of suitable polymers include: low density polyethylene, high density polyethylene, polypropylene, polystyrene, acrylonitrile-butadiene-styrene terpolymers, styreneacrylonitrile copolymers, styrene-butadiene copolymers, polybutene, and poly(4-methyl-pentene-1).

Most preferable results were obtained by using polymers based on polyolefins, with preference being given to the use of a polypropylene based porous material.

Generally, the porous polymer is employed in the form of grains having an average particle diameter of from 0.1 to 10 mm. Alternatively, the polymer may be employed as a granulate and in the form of membranes, fibers which may be hollow or not, and the like. Use in the form of a granulate or powder may be in a packed or fluidized bed. When fibers which may be hollow or not are employed, they are used in the form of fabrics and non-wovens, respectively.

The porous materials filled with secondary amine which, according to the present invention, are suitable for the removal of gaseous impurities may be obtained by filling porous polymers the making of which is described in U.S. Pat. No. 4,247,498, which is incorporated herein by reference in its entirety. However, the preferred preparative process is a variation on one described in GB-A-2 115 425, which is incorporated herein by reference in its entirety, which proceeds as follows: first, from 5 to 90 wt. % of a polymer is dissolved, with heating, at a temperature beyond the critical demixing temperature Tc, in from 10 to 95 wt. % of one or, where necessary, more liquid and miscible compounds A and/or B and/or C, the selected A/B/C mixing ratio being such as will give phase separation on cooling, resulting in a polymer-rich and a polymer-poor phase. On further lowering of the temperature the phase separation structure will be fixed prior to the completion of phase separation due to the polymer vitrifying or crystallizing, resulting in a porous polymer material filled with one or more of compounds A and/or B and/or C and preeminently suited to be used according to the present invention, either as such or after a reduction if so desired. Usually, compound C is added when compounds A and/or B display such a high affinity for the polymer as will result in there not being any liquid/liquid phase separation on cooling prior to vitrification or crystallization.

Up to now, favorable results have been obtained using polypropylene and a mixture of coco- or $C_{12}$ to $C_{14}$-alkyl diethanol amine, ditridecyl amine, and the polar triethylene glycol added to prevent the formation, on account of the ditridecyl amine's strongly apolar character, of a waxy instead of a porous structure on cooling. The pore structure can be affected by adding greater or lesser amounts of triethylene glycol. It has been found the highest absorption capacity for $CS_2$ is obtained when using an equimolar mixture of the secondary ditridecyl amine and the tertiary $C_{12}$ to $C_{14}$-alkyl diethanol amine, to which there must further be added about 10 wt. % of triethylene glycol, calculated on the amount of ditridecyl amine and $C_{12}$ to $C_{14}$-alkyl diethanol amine.

The invention will be further illustrated with reference to the following specific examples. It is understood that these examples are given by way of illustration and are not meant to limit the disclosure or the claims to follow.

EXAMPLE I 3.5 g of macroporous polypropylene powder having a porosity of 3 ml/g, composed of particles of an average diameter of 320 $\mu$m and an average pore diameter of 6 $\mu$m, were filled with 1.56 g of dibenzyl amine and 4.94 g of N,N-bis(2-hydroxyethyl) cocoamine (C12/C14-alkyl diethanol amine). About 2 g of this material were used to fill a column (length 93 mm. diameter 8.3 mm) in the form of a packed bed. Next, there was passed over this bed, per minute, 0.4 liter of a $CS_2$-containing air mixture (2.5 g $CS_2$ per m³). The $CS_2$ concentration of the outflowing air was measured continuously with the aid of an infrared detector. As soon as a $CS_2$ concentration was measured in the outflowing air which exceeded 1% of the inflowing air mixture's $CS_2$ concentration, the amount of absorbed $CS_2$ was calculated. The increase in weight corresponded to 1.2 wt. %, calculated on the bed mass.

EXAMPLE II

The experiment of Example I was repeated, with the proviso that this time 3.5 g of the macroporous polypropylene powder was filled with 3.1 g of N-oleyl-butyl-3-aminopropanoate and 3.4 g of N,N-bis(2-hydroxyethyl) cocoamine. After one hour's passage of air the increase in weight of the packed bed was determined, after which the bed was regenerated by being placed in a 90° C. oven for half an hour with the passage of 0.4 liter of pre-heated nitrogen per minute. Loading and regeneration were repeated eight times. For each of these experiments the increase in weight after one hour's passage of air is given in the table below.

TABLE 1

| Loading experiment | wt. % of absorbed $CS_2$ |
|---|---|
| 1 | 3.7 |
| 2 | 3.6 |
| 3 | 3.4 |
| 4 | 2.8 |
| 5 | 3.1 |
| 6 | 2.6 |
| 7 | 2.8 |
| 8 | 2.6 |

EXAMPLE III a) Preparation of the Absorption Material

The primary amino group of N-coco-1,3-propane diamine was blocked by the addition, at a temperature in the range of from 20° C. to 30° C. of 117.67 g of propylene carbonate to 300 g of this diamine, after which there was stirring at room temperature for a further hour. Next, 35 g of polypropylene were dissolved in 65 g of the above-mentioned reaction product at a temperature of 240° C. Following cooling and grinding of the solidified mass, amine filled macroporous particles having an average diameter of 400 $\mu$m and an average pore diameter of 11 $\mu$m were obtained.

b) Use of the Material for $CS_2$ Absorption and Regeneration

About 2 g of this material were used to fill a column (length 93 mm, diameter 8.3 mm) in the form of a packed bed. Next, there was passed over this bed, per minute, 0.4 liter of an air mixture containing 2.5 g $CS_2$ per m³. The $CS_2$ concentration of the outflowing air was continuously measured with the aid of an infrared detector. As soon as a $CS_2$ concentration was measured in the outflowing air which exceeded 1% of the inflowing air mixture's $CS_2$ concentration, the amount of absorbed $CS_2$ was calculated. The increase in weight corresponded to 3.25 wt. %, calculated on the bed mass. Next, the bed was regenerated by being placed in a 90° C. oven for half an hour with the passage of 0.4 liter of pre-heated nitrogen per minute. Subsequently, loading with $CS_2$ was carried out again, with only 0.2 wt. % of $CS_2$, calculated on the bed mass, being absorbed. The regeneration temperature was then increased to 110° C., whereupon loading and regeneration were repeated eight times. For each of these experiments the increase in weight after one hour's passage of air is given in the table below.

TABLE 2

| Loading experiment | wt. % of absorbed $CS_2$ |
|---|---|
| 1 | 1.9 |
| 2 | 1.5 |
| 3 | 1.4 |
| 4 | 1.75 |
| 5 | 1.5 |
| 6 | 1.7 |
| 7 | 1.75 |
| 8 | 1.8 |

Next, an additional five loading/regeneration cycles were performed, this time with air of the same composition as the dry $CS_2$-containing air mixture but with a relative humidity of 90% (at room temperature) being passed through the bed. Loading and regeneration were repeated five times. For each of these experiments the amount of absorbed $CS_2$ after one hour's passage of $CS_2$-containing humid air is given in the table below.

TABLE 3

| Loading experiment | wt. % of absorbed $CS_2$ |
|---|---|
| 9 | 2.6 |
| 10 | 2.55 |
| 11 | 2.55 |
| 12 | 2.35 |
| 13 | 2.45 |

EXAMPLE IV

The experiment of Example I was repeated, with the proviso that this time 3.5 g of the macroporous polypropylene powder was filled with 3.05 g of ditridecyl amine and 3.45 g of N,N-bis(2-hydroxyethyl) cocoamine.

About 2 g of this material were used to fill a column (length 93 mm, diameter 8.3 mm) in the form of a packed bed. Next, there was passed over this bed, per minute, 0.4 liter of a $CS_2$-containing air mixture (2.5 g $CS_2$ per m³). The $CS_2$ concentration of the outflowing air was continuously measured with the aid of an infrared detector. As soon as a $CS_2$ concentration was measured in the outflowing air which exceeded 1% of the inflowing air mixture's $CS_2$ concentration, the amount of absorbed $CS_2$ was calculated, after which the bed was regenerated by being placed in a 90° C. oven for half an hour with the passage of 0.4 liter of pre-heated nitrogen per minute. Loading and regeneration were repeated eight times. For each of these experiments the weight percentage of absorbed $CS_2$, calculated on the bed weight, is indicated in the table below.

TABLE 4

| Loading experiment | wt. % of absorbed $CS_2$ |
|---|---|
| 1 | 3.15 |
| 2 | 2.15 |
| 3 | 2.15 |
| 4 | 1.95 |
| 5 | 1.80 |
| 6 | 1.95 |
| 7 | 1.90 |
| 8 | 1.45 |

TABLE 4-continued

| Loading experiment | wt. % of absorbed CS$_2$ |
|---|---|
| 9 | 1.60 |
| 10 | 1.65 |

Next, the packed bed was regenerated at 110° C. For each of these experiments the weight percentage of absorbed CS$_2$, calculated on the bed weight, is given in the table below.

TABLE 5

| Loading experiment | wt. % of absorbed CS$_2$ |
|---|---|
| 11 | 1.70 |
| 12 | 1.60 |

Next, an additional three loading/regeneration cycles were performed, this time with air of the same composition as the dry CS$_2$-containing air mixture but with a relative humidity of 90% (at room temperature) being passed through the bed. Loading and regeneration were repeated three times. For each of these experiments the weight percentage of absorbed CS$_2$, calculated on the bed weight, is given in the table below.

TABLE 6

| Loading experiment | wt. % of absorbed CS$_2$ |
|---|---|
| 13 | 2.0 |
| 14 | 2.1 |
| 15 | 2.2 |

EXAMPLE V a) Preparation of the Absorption Material

At a temperature of 250° C., 30 g of polypropylene were dissolved in 36 g of ditridecyl amine, 7 g of triethylene glycol, and 27 g of N,N-bis(2-hydroxyethyl) cocoamine and homogenized until a clear solution was obtained. Following cooling and grinding of the solidified mass, amine filled macroporous particles having an average diameter of 350 μm and an average pore diameter of 5 μm were obtained.

b) Use of the Material for CS$_2$ Absorption and Regeneration

About 2 g of this material was used to fill a column (length 93 mm, diameter 8.3 mm) in the form of a packed bed. Next, there was passed over this bed, per minute, 0.4 liter of a CS$_2$-containing air mixture (2.5 g CS$_2$ per m$^3$). The CS$_2$ concentration of the outflowing air was continuously measured with the aid of an infrared detector. As soon as a CS$_2$ concentration was measured in the outflowing air which exceeded 1% of the inflowing air mixture's CS$_2$ concentration, the amount of absorbed CS$_2$ was calculated. Next, the bed was regenerated by being placed in a 110° C. oven for half an hour with the passage of 0.4 liter of pre-heated nitrogen per minute. In all, six experiments were carried out using the same packed bed. For each of these experiments the weight percentage of absorbed CS$_2$, calculated on the bed weight, is given in the table below.

TABLE 7

| Loading experiment | wt. % of absorbed CS$_2$ |
|---|---|
| 1 | 3.95 |
| 2 | 3.50 |
| 3 | 3.50 |
| 4 | 3.75 |
| 5 | 3.80 |
| 6 | 4.10 |

EXAMPLE VI

The experiment of Example V was repeated, with the proviso that there was passed over the bed 0.28 liter/minute of a humid air mixture containing 0.45 g CS$_2$ per m$^3$. The CS$_2$ concentration of the outflowing air was continuously measured with the aid of an infrared detector. As soon as a CS$_2$ concentration was measured in the outflowing air which exceeded 1% of the inflowing air mixture's CS$_2$ concentration, the amount of absorbed CS$_2$ was calculated. At that moment 2.2 wt. % of CS$_2$ had been absorbed by the bed.

EXAMPLE VII

The experiment of Example VI was repeated, with the proviso that this time the rate of flow of the air mixture was 2 liters per minute. The CS$_2$ concentration of the outflowing air was continuously measured with the aid of an infrared detector. As soon as a CS$_2$ concentration was measured in the outflowing air which exceeded 1% of the inflowing air mixture's CS$_2$ concentration, the amount of absorbed CS$_2$ was calculated. At that moment 2.1 wt. % of CS$_2$ had been absorbed by the bed.

EXAMPLE VIII

The experiment of Example V was repeated, with the proviso that this time 0.4 liter per minute of an air mixture containing 1.8 wt. % of CO$_2$ was passed over the bed. The CO$_2$ concentration of the outflowing air was measured with the aid of an infrared detector. It was found that no CO$_2$ was absorbed.

While the invention has been described with preferred embodiments, it is to be understood that variations and modifications are to be considered within the purview of the scope of the claims appended hereto.

What is claimed is:

1. A method for the removal of gaseous impurities from a gas mixture comprising contacting said gas mixture with a hydrophobic polymer having pores of an average diameter in the range of from 0.1 to 50 μm in which there is incorporated a secondary amine having hydrophobic properties which chemically bonds with gaseous impurities to be removed.

2. The method according to claim 1, wherein the gaseous impurities to be removed comprise H$_2$, COS, CS$_2$ or SO$_2$.

3. The method according to claim 1, wherein the average diameter of the pores is in the range of from 0.2 to 15 μm.

4. The method according to claim 1, wherein the secondary amine is incorporated into a hydrophobic liquid.

5. A method for purifying a gas, the method comprising:
    providing a gas purifier which comprises a chamber having an inlet, an outlet and an interior space at least partially occupied by a selectively absorbent porous material which includes a hydrophobic polymer having pores of an average diameter in the range of from 0.1 to 50 µm, at least a portion of the pores containing a liquid component which includes at least one hydrophobic secondary amine; and passing a gas to be purified through said gas purifier.

6. The method of claim 5 wherein the step of providing a gas purifier comprises a gas purifier wherein the average diameter of the pores is in the range of 0.2 to 15 µm.

7. The method of claim 5 wherein the step of providing a gas purifier comprises a gas purifier wherein the secondary amine is selected from the group consisting of compounds corresponding to the formula $R_1$—NH—$R_2$, wherein $R_1$ represents a functionalized or unfunctionalized aliphatic or araliphatic group with at least 7 carbon atoms and $R_2$ represents a functionalized or unfunctionalized alkyl or aralkyl group with at least 3 carbon atoms and compounds corresponding to the formula $R_3$—NH—$R_4$—NH—C(O)O—$R_5$, wherein $R_3$ represents a functionalized or unfunctionalized aliphatic or araliphatic group with at least 7 carbon atoms, $R_4$ represents a functionalized or unfunctionalized alkylene group with at least 2 carbon atoms, and $R_5$ represents a substituted or unsubstituted alkyl group with at least 2 carbon atoms.

8. The method of claim 5 wherein the step of providing a gas purifier comprises a gas purifier wherein the secondary amine is selected from the group consisting of dibenzyl amine and ditridecyl amine.

9. The method of claim 5 wherein the step of providing a gas purifier comprises a gas purifier wherein the liquid component includes a tertiary amine.

10. The method of claim 9 wherein the step of providing a gas purifier comprises a gas purifier wherein the tertiary amine is a $C_{12}$- to $C_{14}$-alkyl diethanolamine.

11. The method of claim 10 wherein the step of providing a gas purifier comprises a gas purifier wherein the liquid component includes triethylene glycol.

12. The method of claim 11 wherein the step of providing a gas purifier comprises a gas purifier wherein the polymer is polypropylene.

13. The method of claim 12 wherein the step of providing a gas purifier comprises a gas purifier wherein the secondary amine is ditridecyl amine, and the tertiary amine is N,N-bis (2-hydroxyethyl)cocoamine.

* * * * *